US007571292B2

(12) United States Patent
McClure (10) Patent No.: US 7,571,292 B2
(45) Date of Patent: Aug. 4, 2009

(54) PRODUCING TERTIARY INSTANT VIRTUAL COPIES WITHOUT VOLUME SUSPENSION

(75) Inventor: Alan George McClure, Sahuarita, AZ (US)

(73) Assignee: International Business Machines Corporation, Armonk, NY (US)

( * ) Notice: Subject to any disclaimer, the term of this patent is extended or adjusted under 35 U.S.C. 154(b) by 563 days.

(21) Appl. No.: 11/386,514

(22) Filed: Mar. 21, 2006

(65) Prior Publication Data

US 2007/0226437 A1 Sep. 27, 2007

(51) Int. Cl.
*G06F 12/16* (2006.01)
(52) U.S. Cl. .................... 711/162; 707/204
(58) Field of Classification Search ............... 711/162; 707/204; 714/6
See application file for complete search history.

(56) References Cited

U.S. PATENT DOCUMENTS

| 5,504,861 | A | 4/1996 | Crockett et al. |
| 5,557,770 | A | 9/1996 | Bhide et al. |
| 5,615,329 | A | 3/1997 | Kern et al. |
| 6,131,148 | A | 10/2000 | West et al. |
| 6,457,109 | B1 | 9/2002 | Mililllo et al. |
| 6,611,901 | B1 | 8/2003 | Micka et al. |
| 6,728,736 | B2 | 4/2004 | Hostetter et al. |
| 6,854,038 | B2 | 2/2005 | Micka et al. |
| 2003/0140204 | A1* | 7/2003 | Ashton et al. ............... 711/162 |
| 2003/0229754 | A1 | 12/2003 | Micka et al. |
| 2004/0260896 | A1 | 12/2004 | Werner et al. |
| 2004/0260899 | A1 | 12/2004 | Kern et al. |
| 2005/0033827 | A1 | 2/2005 | Yamagami |
| 2006/0048014 | A1* | 3/2006 | Takahashi et al. ............. 714/44 |
| 2006/0069865 | A1* | 3/2006 | Kawamura et al. .......... 711/114 |
| 2007/0050574 | A1* | 3/2007 | Kaiya et al. ................. 711/162 |
| 2007/0067586 | A1* | 3/2007 | Mikami ..................... 711/162 |

* cited by examiner

*Primary Examiner*—Shane M Thomas
(74) *Attorney, Agent, or Firm*—Janaki K. Davda; Konrad Raynes & Victor LLP (57) ABSTRACT

Provided are a techniques for copying data. It is determined that it is time to execute a quick copy command indicating one or more control volume pairs for which a freeze indicator is set to indicate that a freeze is to occur and one or more data volume pairs for which a freeze indicator is set to indicate that a freeze is not to occur. A consistent instant virtual copy operation is performed for each of the one or more control volume pairs for which the freeze indicator is set to indicate that the freeze is to occur. An instant virtual copy operation is performed for each of the one or more data volume pairs for which the freeze indicator is set to indicate that the freeze is not to occur.

30 Claims, 7 Drawing Sheets

PRODUCING TERTIARY INSTANT VIRTUAL COPIES WITHOUT VOLUME SUSPENSION

BACKGROUND

1. Field

Embodiments of the invention relate to producing tertiary instant virtual copies without volume suspension.

2. Description of the Related Art

Computing systems often include one or more host computers ("hosts") for processing data and running application programs, Direct Access Storage Device (DASDs) for storing data, and a storage controller for controlling the transfer of data between the hosts and the DASD. Storage controllers may also be referred to as control units or storage directors.

Disaster recovery systems typically address two types of failures, a sudden catastrophic failure at a single point in time or data loss over a period of time. In the second type of gradual disaster, updates to volumes (e.g., Logical Unit Numbers, Logical Devices, etc.) that store data may be lost. To assist in recovery of data updates, a copy of data may be provided at a remote location. Such dual or shadow copies (also referred to as secondary copies) are typically made as the application system is writing new data to a primary storage device. In some systems, a third copy (i.e., a tertiary copy) is maintained (e.g., in case the shadow copy is corrupted). International Business Machines Corporation (IBM), the assignee of the subject patent application, provides backup systems for maintaining remote copies of data at a secondary storage device, including extended remote copy (XRC®) and peer-to-peer remote copy (PPRC®).

These backup systems provide a technique for recovering data updates between a last, safe backup and a system failure. Such data shadowing systems can also provide an additional remote copy for non-recovery purposes, such as local access at a remote site.

In such backup systems, data is maintained in volume pairs. A volume pair is comprised of a volume in a primary storage device and a corresponding volume in a secondary storage device that includes a consistent copy of the data maintained in the primary volume. Typically, the primary volume of the pair will be maintained in a primary direct access storage device (DASD) and the secondary volume of the pair is maintained in a secondary DASD shadowing the data on the primary DASD. A primary storage controller may be provided to control access to the primary DASD and a secondary storage controller may be provided to control access to the secondary DASD.

In the IBM XRC® backup system, the application system writing data to the primary volumes includes a sysplex timer which provides a time-of-day (TOD) value as a time stamp to data writes. The application system time stamps data sets when writing such data sets to volumes in the primary DASD. The integrity of data updates is related to insuring that updates are done at the secondary volumes in the volume pair in the same order as they were done on the primary volume. In the XRC® backup system, the time stamp provided by the application program determines the logical sequence of data updates. In many application programs, such as database systems, certain writes cannot occur unless a previous write occurred; otherwise the data integrity would be jeopardized. Such a data write whose integrity is dependent on the occurrence of previous data writes is known as a dependent write. For instance, if a customer opens an account, deposits $400, and then withdraws $300, the withdrawal update to the system is dependent on the occurrence of the other writes, the opening of the account and the deposit. When such dependent transactions are copied from the primary volumes to secondary volumes, the transaction order must be maintained to maintain the integrity of the dependent write operation.

Volumes in the primary and secondary DASDs are consistent when all writes have been transferred in their logical order, i.e., all dependent writes transferred first before the writes dependent thereon. In the banking example, this means that the deposit is written to the secondary volume before the withdrawal. A consistency group is a collection of related volumes that need to be kept in a consistent state. A consistency transaction set is a collection of updates to the primary volumes such that dependent writes are secured in a consistent manner. For instance, in the banking example, in order to maintain consistency, the withdrawal transaction needs to be in the same consistent transactions set as the deposit or in a later consistent transactions set; the withdrawal cannot be in an earlier consistent transactions set. Consistency groups maintain data consistency across volumes. For instance, if a failure occurs, the deposit will be written to the secondary volume before the withdrawal. Thus, when data is recovered from the secondary volumes, the recovered data will be consistent.

A consistency time is a time the system derives from the application system's time stamp to the data set. A consistency group has a consistency time for all data writes in a consistency group having a time stamp equal or earlier than the consistency time stamp. In the IBM XRC® backup system, the consistency time is the latest time to which the system guarantees that updates to the secondary volumes are consistent. As long as the application program is writing data to the primary volume, the consistency time increases. However, if update activity ceases, then the consistency time does not change as there are no data sets with time stamps to provide a time reference for further consistency groups. If all the records in the consistency group are written to secondary volumes, then the reported consistency time reflects the latest time stamp of all records in the consistency group. Techniques for maintaining the sequential consistency of data writes and forming consistency groups to maintain sequential consistency in the transfer of data between a primary DASD and secondary DASD are described in U.S. Pat. Nos. 5,615,329 and 5,504,861, which are assigned to International Business Machines Corporation, the assignee of the subject patent application, and which are incorporated herein by reference in their entirety.

A number of DASD subsystems are capable of performing "instant virtual copy" operations, also referred to as "fast replicate functions." Instant virtual copy operations work by modifying metadata such as relationship tables or pointers to treat a primary data object as both the original and copy. In response to a host's copy request, the storage subsystem immediately reports creation of the copy without having made any physical copy of the data. Only a "virtual" copy has been created, and the absence of an additional physical copy is completely unknown to the host.

Later, when the storage system receives updates to the original or copy, the updates are stored separately and cross-referenced to the updated data object only. At this point, the original and copy data objects begin to diverge. The initial benefit is that the instant virtual copy occurs almost instantaneously, completing much faster than a normal physical copy operation. This frees the host and storage subsystem to perform other tasks. The host or storage subsystem may even proceed to create an actual, physical copy of the original data object during background processing, or at another time.

One such instant virtual copy operation is known as a FlashCopy® operation. A FlashCopy® operation involves establishing a logical point-in-time relationship between primary and secondary volumes on the same or different devices. The FlashCopy® operation guarantees that until a track in a FlashCopy® relationship has been hardened to its location on the secondary disk, the track resides on the primary disk. A relationship table is used to maintain information on all existing FlashCopy® relationships in the subsystem. During the establish phase of a FlashCopy® relationship, one entry is recorded in the primary and secondary relationship tables for the primary and secondary that participate in the FlashCopy® being established. Each added entry maintains all the required information concerning the FlashCopy® relationship. Both entries for the relationship are removed from the relationship tables when all FlashCopy® tracks from the primary extent have been physically copied to the secondary extents or when a withdraw command is received. In certain cases, even though all tracks have been copied from the primary extent to the secondary extent, the relationship persists.

The secondary relationship table further includes a bitmap that identifies which tracks involved in the FlashCopy® relationship have not yet been copied over and are thus protected tracks. Each track in the secondary device is represented by one bit in the bitmap. The secondary bit is set when the corresponding track is established as a secondary track of a FlashCopy® relationship. The secondary bit is reset when the corresponding track has been copied from the primary location and destaged to the secondary device due to writes on the primary or the secondary device, or a background copy task.

Further details of the FlashCopy® operations are described in commonly assigned U.S. Pat. No. 6,611,901, which is incorporated herein by reference in its entirety.

Once the logical relationship is established, hosts may then have immediate access to data on the primary and secondary volumes, and the data may be copied as part of a background operation. A read to a track that is a secondary in a FlashCopy® relationship and not in cache triggers a stage intercept, which causes the primary track corresponding to the requested secondary track to be staged to secondary cache at the secondary storage device when the primary track has not yet been copied over and before access is provided to the track from the secondary cache. This ensures that the secondary has the copy from the primary that existed at the point-in-time of the FlashCopy® operation. Further, any destages to tracks on the primary device that have not been copied over triggers a destage intercept, which causes the tracks on the primary device to be copied to the secondary device.

Instant virtual copy techniques have been developed, at least in part, to quickly create a duplicate copy of data without interrupting or slowing foreground processes. Instant virtual copy techniques, such as a FlashCopy® operation, provide a point-in-time copy tool.

In disaster recovery scenarios, the data restored from the secondary storage device needs to be consistent to provide value to a customer. Currently, users of IBM XRC® backup systems suspend mirroring of volumes (i.e., stop applying updates from the primary copy to the secondary (shadow) copy) in order to create a consistent tertiary copy of data for disaster recovery tests and other purposes. The process of suspending the mirroring, performing a Flashcopy® operation from the secondary copy to the tertiary copy, and resynchronization of the secondary copy with the primary copy may take a long time to complete. During this period, the secondary copies do not contain a usable copy of the data, and, should a disaster occur, recovery would have to be done with older data in the tertiary copies. The age of the tertiary data will likely exceed the user's recovery point objective (i.e., the amount of acceptable data loss after disaster recovery).

Thus, there is a need for producing tertiary instant virtual copies without volume suspension.

SUMMARY OF EMBODIMENTS OF THE INVENTION

Provided are a method, computer program product, and system for copying data. It is determined that it is time to execute a quick copy command indicating one or more control volume pairs for which a freeze indicator is set to indicate that a freeze is to occur and one or more data volume pairs for which a freeze indicator is set to indicate that a freeze is not to occur. A consistent instant virtual copy operation is performed for each of the one or more control volume pairs for which the freeze indicator is set to indicate that the freeze is to occur. An instant virtual copy operation is performed for each of the one or more data volume pairs for which the freeze indicator is set to indicate that the freeze is not to occur.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

Embodiments employ a consistent instant virtual copy operation on control volumes to pause a system data mover on a consistency group boundary, while data volumes are copied via an instant virtual copy operation to create a tertiary copy without volume suspension (i.e., without suspending volumes for which the tertiary copy is to be made). Volume suspension may be described as a persistent state in which updates are not propagated from the primary copy to the secondary copy. Volume suspension employs a change recording bitmap and requires resynchronization to return volumes to a duplex state. A duplex state may be described as one in which updates are being mirrored between the primary copy and the secondary copy (i.e., after the initial copying of data from the primary copy to the secondary copy has completed). Embodiments leave the volumes in duplex state, temporarily pause propagation on a consistency group boundary just long enough to produce the tertiary instant virtual copy, and then resume mirroring. Thus, this allows the tertiary copy to be created without a mirroring outage. An example of a consistent instant virtual copy operation is described in U.S. Patent Application No. 2004/0260896, published on Dec. 23, 2004, having Ser. No. 10/464,937, filed on Jun. 18, 2003, by Sam C. Werner et al., which is incorporated by reference herein in its entirety.

Figure 1:
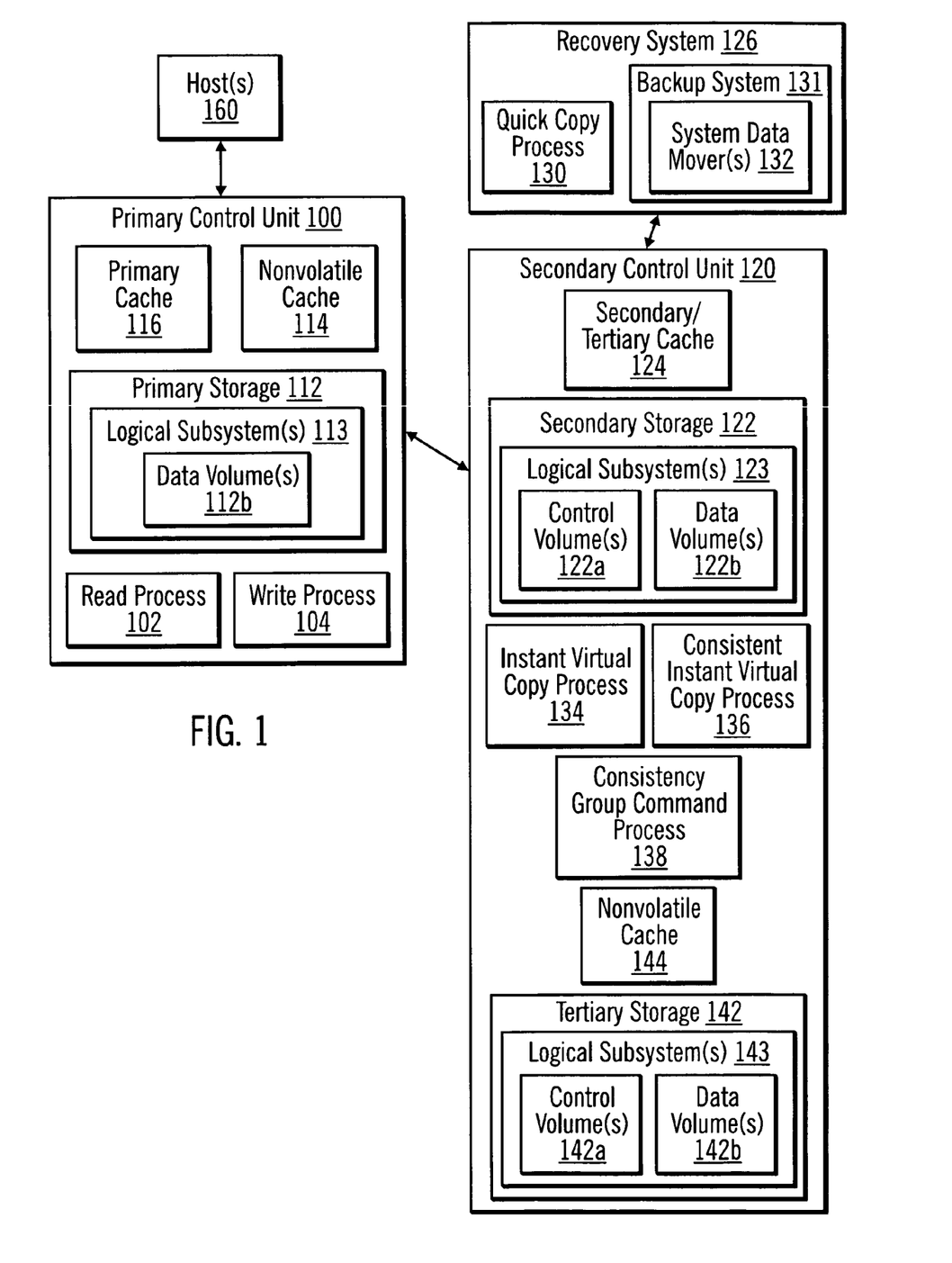
FIG. 1 illustrates a computing environment in accordance with certain embodiments of the invention.

FIG. 1 illustrates details of a computing environment in accordance with certain embodiments. A primary control unit 100 provides one or more hosts 160 access to primary storage 112.

The primary storage 112 may be represented as one or more logical subsystems 113, each of which includes one or more data (non-control) volumes 112b. A logical subsystem may be described as a way of grouping volumes for access by the host 160. Volumes 112b in primary storage 112 may be divided into blocks of storage containing blocks of data. In certain embodiments, the blocks of data are contents of tracks, while the sub-blocks of data are contents of sectors of tracks. For ease of reference, the terms tracks and sectors may be used herein as examples of blocks of data and sub-blocks of data, but use of these terms is not meant to limit the embodiments of the invention to tracks and sectors. The embodiments of the invention are applicable to any type of storage, block of storage or block of data divided in any manner.

The primary control unit 100 includes a primary cache 116 in which updates to blocks of data in the primary storage 112 are maintained until written to primary storage 112 (i.e., the blocks of data are destaged). Additionally, the primary control unit 100 includes a nonvolatile cache 114. The nonvolatile cache 114 may be, for example, a battery-backed up volatile memory, to maintain a non-volatile copy of data updates. The primary control unit 100 includes a read process 102 for reading data, and a write process 104 for writing data.

A recovery system 126 includes a quick copy process 130 for creating a tertiary copy without volume suspension. The recovery system 126 also includes a backup system 131 (e.g., an IBM XRC® backup system) that includes one or more system data movers 132 for transferring data from secondary storage 122 to tertiary storage 142 at the secondary control unit 120. In certain embodiments, the system data movers 132 transfer data asynchronously.

Secondary control unit 120 provides one or more recovery systems 126 access to secondary storage 122, which maintains back-up copies of all or a subset of the volumes of the primary storage 112. The secondary storage 122 may be represented as one or more logical subsystems 123, each of which includes one or more control volumes 122a and one or more data (non-control) volumes 122b. Volumes 122a, 122b in secondary storage 122 may also be divided into blocks of storage containing blocks of data, and the blocks of storage are further divided into sub-blocks of storage that contain sub-blocks of data. In certain embodiments, the blocks of data are tracks, while the sub-blocks of data are sectors of tracks. For ease of reference, the terms tracks and sectors may be used herein as examples of blocks of data and sub-blocks of data, but use of these terms is not meant to limit the embodiments of the invention to tracks and sectors. The embodiments of the invention are applicable to any type of storage, block of storage or block of data divided in any manner.

In certain embodiments, the tertiary storage 142 may be represented as one or more logical subsystems 143, each of which includes one or more control volumes 142a and one or more data (non-control) volumes 142b. While some embodiments may use separate logical subsystems for secondary and tertiary storage, in other embodiments, secondary and tertiary volumes reside within the same logical subsystem. Volumes 142a, 142b in tertiary storage 142 may also be divided into blocks of storage containing blocks of data, and the blocks of storage are further divided into sub-blocks of storage that contain sub-blocks of data. In certain embodiments, the blocks of data are tracks, while the sub-blocks of data are sectors of tracks. For ease of reference, the terms tracks and sectors may be used herein as examples of blocks of data and sub-blocks of data, but use of these terms is not meant to limit the embodiments of the invention to tracks and sectors. The embodiments of the invention are applicable to any type of storage, block of storage or block of data divided in any manner.

The secondary control unit 120 includes a secondary/tertiary cache 124 in which updates to blocks of data in the secondary storage 122 and/or tertiary storage 142 are maintained until written to secondary storage 122 (i.e., the blocks of data are destaged). The secondary control unit 120 also includes nonvolatile cache 144. The cache 124 and non-volatile cache 144 may be shared among multiple logical subsystems 122, 142.

Storages 112, 122, and 142 and caches 114, 124, and 144 may store at the same time blocks of data in different copy relationships. The control volumes 122a, 142a include control data and journal data, and may contain other data. The data volumes 122b, 142b include non-control data (e.g., application data). Control data may be described as reflecting the state of backup system 131 operations and consistency for a system data mover 132. Journal data may be described as containing a temporary copy of updates that are used to make the secondary or tertiary volumes consistent in a recovery situation. Journal data may also be described as a form of application data.

In certain embodiments, removable storage (instead of or in addition to remote storage, such as secondary storage 122) may be used to maintain back-up copies of all or a subset of the primary storage 112, and the embodiments of the invention transfer data to the removable storage rather than to the remote storage. The removable storage may be coupled to the primary control unit 100.

In certain embodiments, the primary control unit 100 and/or secondary control unit 120 may comprise any computing device known in the art, such as a mainframe, server, personal computer, workstation, laptop, handheld computer, telephony device, network appliance, virtualization device, storage controller, etc.

A primary site may include multiple primary control units, primary storage, and/or host computers. A secondary site may include multiple secondary control units, recovery systems, and/or secondary storage.

In certain embodiments, primary storage 112, secondary storage 122, and tertiary storage 142 may be Direct Access Storage Device (DASD).

In certain embodiments, the primary control unit 100 and secondary control unit 120 may be coupled via a network, which may comprise any type of network, such as, for example, a Storage Area Network (SAN), a Local Area Network (LAN), Wide Area Network (WAN), the Internet, an Intranet, etc.

In certain embodiments, the primary control unit 100 and secondary control unit 120 communicate via communication paths, such as direct high speed transmission lines (e.g., an Enterprise System Connection (ESCON®) link. However, the communication paths may be comprised of any other communication means known in the art, including network transmission lines, fiber optic cables, etc.

In certain embodiments, data is maintained in volume pairs. A volume pair is comprised of a volume in a first storage device (e.g., primary storage 112) and a corresponding volume in a second storage device (e.g., secondary storage 122) that includes a consistent copy of the data maintained in the primary volume. For example, primary storage 112 may include Volume1 and Volume2, and secondary storage 122 may contain corresponding Volume1 and Volume2. Likewise, secondary storage 122 may contain Volume1 and Volume2 that correspond to Volume1 and Volume2 in tertiary storage 142.

When a host 160 wishes to update a block of data in primary storage 112, the host 160 writes data to a block of storage in primary cache 116. Write operations modify the block of data in primary cache 116 synchronously (i.e., writing host 160 waits for the operation to complete), and, then, in a background process, primary cache 116 content is written to primary storage 112. A write operation may update data, write new data or write the same data again. Writing data in primary cache 116 to primary storage 112 is called a destage operation. With a destage operation, the cached track is not removed from primary cache 116. When a cached track has to be removed from primary cache 116 in order to free space for other data, the cached track is said to be demoted. Copying all or a portion of a track from primary storage 112 to primary cache 116 is referred to as a staging operation. Moreover, data may be staged from primary storage 112 to secondary cache 124.

Figure 2:
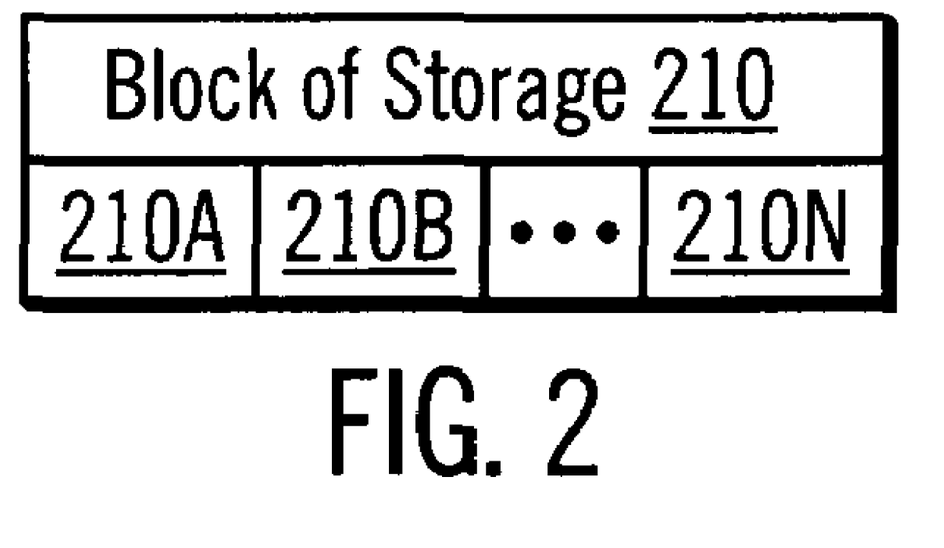
FIG. 2 illustrates a block of storage in accordance with certain embodiments.

FIG. 2 illustrates a block of storage in accordance with certain embodiments. A block of storage 210 contains blocks of data and is further subdivided into sub-blocks of storage 210A, 210B, . . . 210N (210A-210N, where N may be any number) that store sub-blocks of data.

Figure 3:
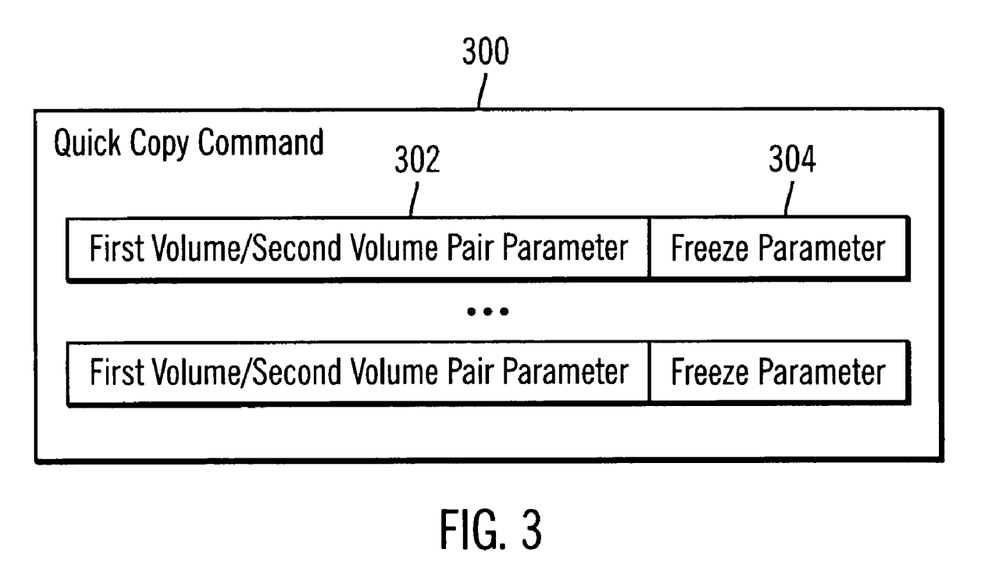
FIG. 3 illustrates parameters of a "quick copy" command in accordance with certain embodiments.

FIG. 3 illustrates parameters of a "quick copy" command 300 in accordance with certain embodiments. A user at recovery system 126 may issue the "quick copy" command to create a tertiary copy in tertiary storage 142 from a secondary copy in secondary storage 122 or may schedule the "quick copy" command to be executed at a certain time, at certain time intervals or based on certain conditions. The quick copy process 130 executes the "quick copy" command.

The "quick copy" command includes a first volume/second volume pair parameter 302 and a freeze parameter 304. The first volume/second volume pair parameter 302 identifies a first volume (e.g., a first logical volume that is mapped to a physical volume) from which blocks of data are to be copied and a second volume (e.g., a second logical volume that is mapped to a physical volume) into which blocks of data from the first volume are to be copied.

For each volume pair parameter 302, the "quick copy" command includes a freeze parameter 304. The freeze parameter 304 may be set to indicate that the first volume (e.g., the source volume in a source/target pair) is to be frozen (e.g., may be set to either true to indicate that the volume is to be frozen or to false to indicate that the volume is not to be frozen). If the freeze parameter 304 is set for a volume pair, then a "consistent instant virtual copy" command is issued for that volume pair, with an indication that the first volume is to be frozen. If the freeze parameter 304 is not set for a volume pair, then an "instant virtual copy" command is issued for that volume pair with an indication that the first volume is not to be frozen. Execution of the "consistent instant virtual copy" command causes the first volume indicated in the first volume parameter of the "consistent instant virtual copy" command to stay in an extended long busy state after the "consistent instant virtual copy" command completes, until the appropriate "consistency group" command 400 has been executed. When a volume is in a long busy state, the volume may not be written to by any application. Thus, when the "consistent instant virtual copy" command is executed with the freeze parameter set to indicate that a freeze should occur for the first volume, then the first volume may not be written to until the first volume is "unfrozen" (i.e., a "consistency group" command is executed for that first volume). In embodiments of the invention, the control volume 122a, 142a pairs may have an associated freeze parameter set to indicate that the control volumes identified as the first volume in each pair is to be frozen, while data volume 122b, 142b pairs may have an associated freeze parameter set to indicate that the data volumes are not to be frozen.

Figure 4:
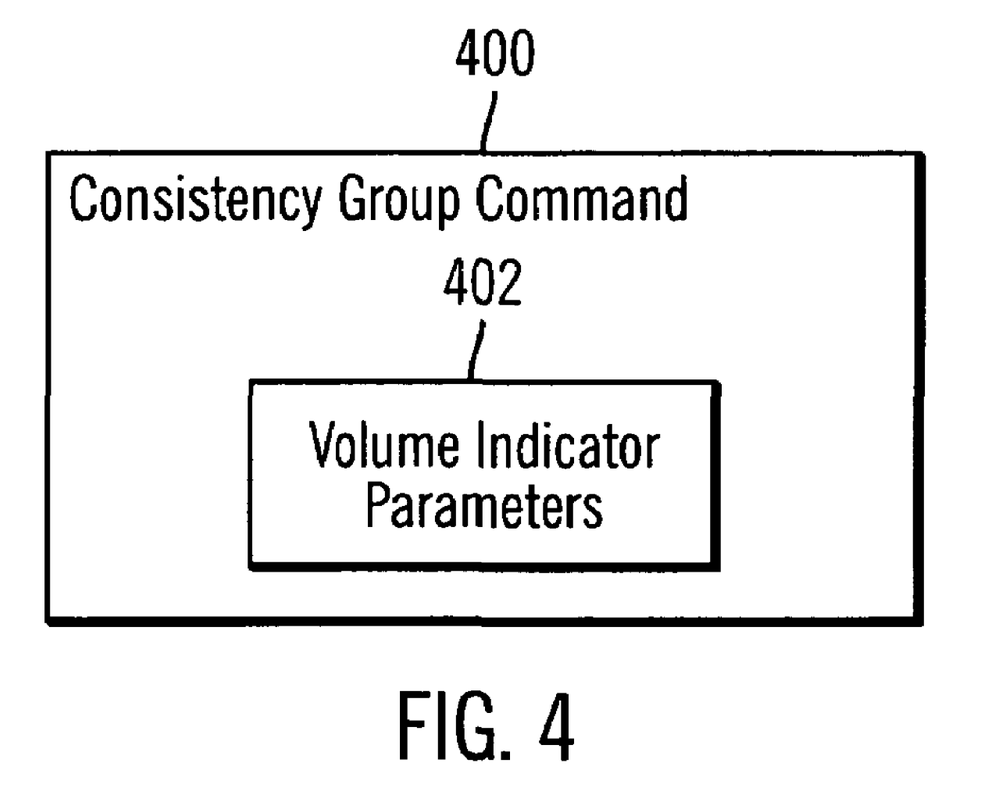
FIG. 4 illustrates parameters of a "consistency group" command in accordance with certain embodiments.

FIG. 4 illustrates parameters of a "consistency group" command 400 in accordance with certain embodiments. The "consistency group" command 400 may include volume indicator parameters 402, where the volume indicator parameters 402 indicate a set of volumes whose long busy state should be reset when the "consistency group" command 400 is executed. When the long busy state of a volume is reset, the volume may be written to by the system data mover 132 of the backup system 131 an application. In certain embodiments, the long busy state of a volume is reset by addressing the appropriate logical subsystems (e.g., logical subsystem 123) that include the volumes whose busy state should be reset. In alternative embodiments, the volume indicator parameters 402 may indicate a set of volumes whose long busy state should be reset.

Figure 5:
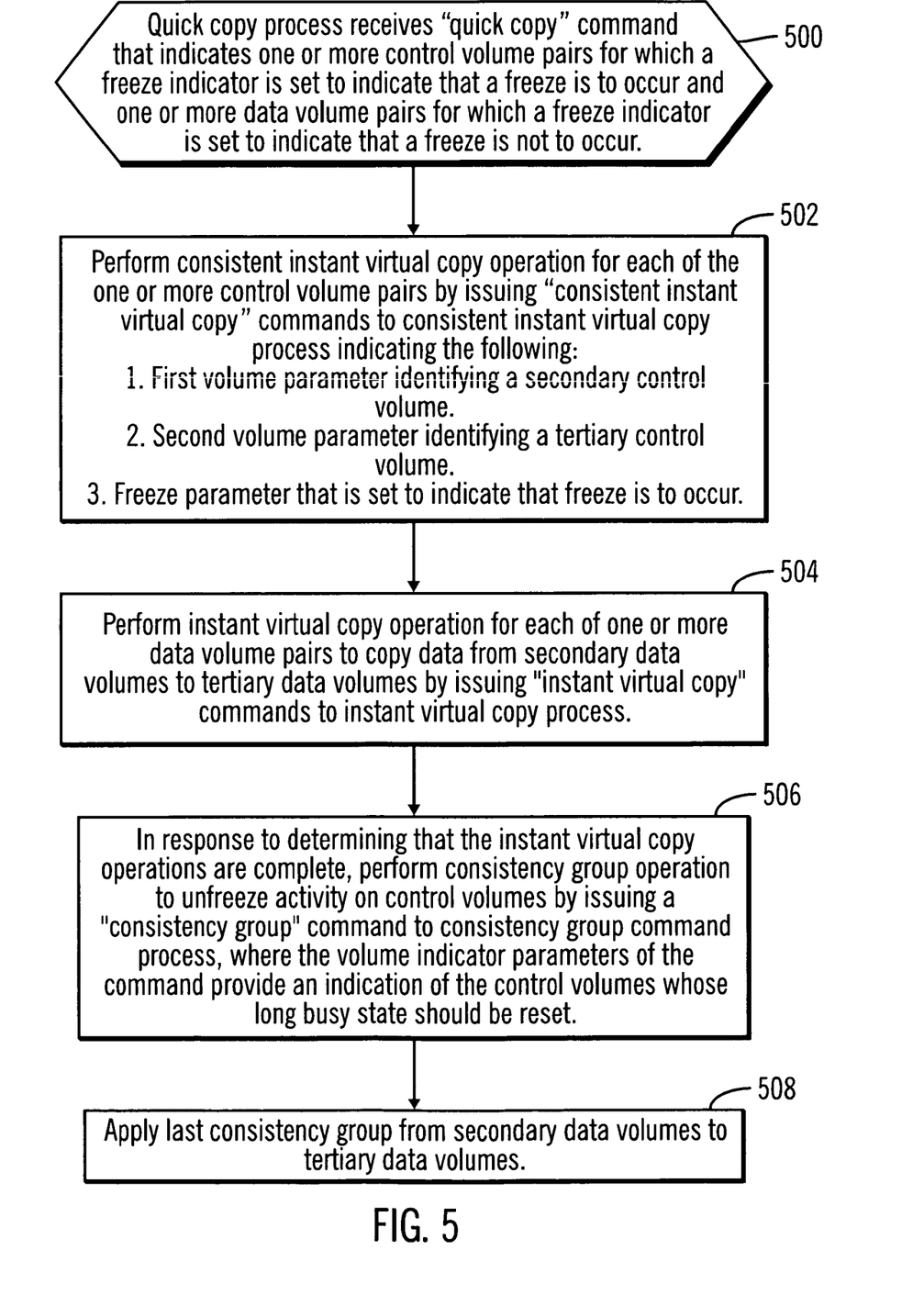
FIG. 5 illustrates logic performed to create a tertiary copy in accordance with certain embodiments.

FIG. 5 illustrates logic performed to create a tertiary copy in accordance with certain embodiments. In block 500, the quick copy process 130 receives a "quick copy" command 300 that indicates one or more control volume pairs for which a freeze indicator is set to indicate that a freeze is to occur and one or more data volume pairs for which a freeze indicator is set to indicate that a freeze is not to occur. In particular, the quick copy process 130 may receive the "quick copy" command 300 from a user via the recovery system 126 or may determine that it is time to execute a scheduled "quick copy" command.

In block 502, the quick copy process 130 performs a consistent instant virtual copy operation for each of the one or more control volume pairs 122a, 142a that is to be frozen by issuing "consistent instant virtual copy" commands to the consistent virtual copy process 136 at the secondary control unit 120 indicating a first volume parameter that identifies a secondary control volume 122a, a second volume parameter that identifies a tertiary control volume 142a, and a freeze parameter that is set to indicate that freeze is to occur.

In block 504, the quick copy process 130 performs an instant virtual copy operation for each of one or more data volume pairs 122b, 142b to copy data from secondary data volumes 122b to tertiary data volumes 142b by issuing "instant virtual copy" commands to the instant virtual copy process 134 at the secondary control unit 120.

In response to determining that the instant virtual copy operations are complete (i.e., when data volume copying is completed), in block 506, the quick copy process 130 performs a consistency group operation to unfreeze activity on the control volumes 122a, 142a by issuing a "consistency group" command to the consistency group command process 138 at the secondary control unit 120, where the volume indicator parameters of the consistency group command provide an indication of the control volumes whose long busy state should be reset. The consistency group command process 138 then resets the log busy state of the indicated control volumes.

In block 508, a system data mover 132 applies the last consistency group from the secondary data volumes 122b to the tertiary data volumes 142b. This ensures that if the system data movers 132 had not completed copying the last consistency group at the time the consistent instant virtual copy operation was started, that last consistency group is applied to the tertiary data volumes 142.

Figure 6:
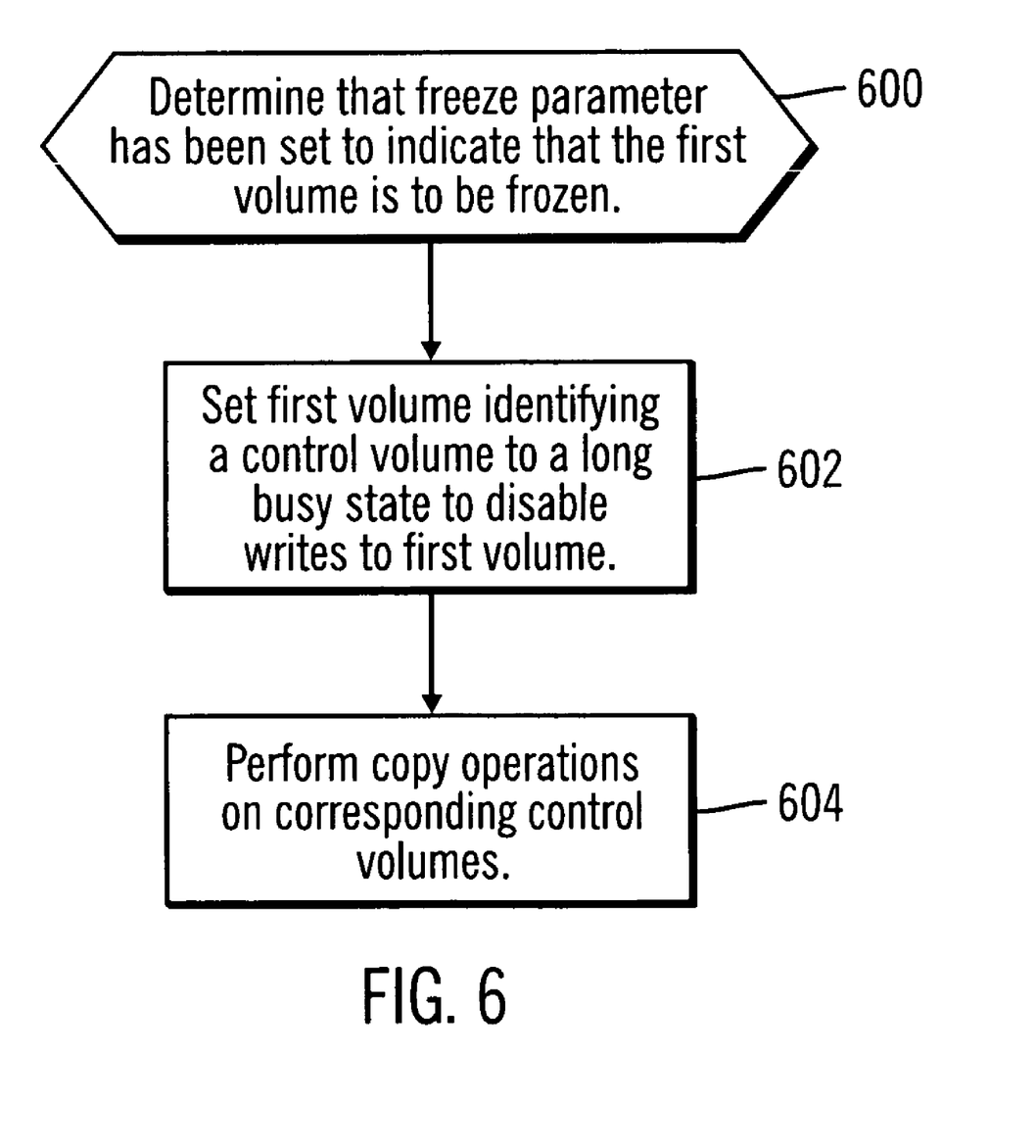
FIG. 6 illustrates logic performed to execute a "consistent instant virtual copy" command.

FIG. 6 illustrates logic performed to execute the "consistent instant virtual copy" command. Control begins at block 600 with the consistent instant virtual copy process 136 determining that the freeze parameter in the "consistent instant virtual copy" command has been set to indicate that the first volume identified in the "consistent instant virtual copy" command is to be frozen. In block 602, the consistent instant virtual copy process 136 sets the first volume identifying a control volume to a long busy state to disable writes to the first volume. In block 604, the consistent instant virtual copy process 136 performs copy operations on the control volumes to copy the first control volume (e.g., 122b) to the corresponding second control volume (e.g., 142b).

Thus, when a "quick copy" command is executed, prior to initiating an instant virtual copy operation on the data volume pairs 122b, 142b, a consistent instant virtual copy operation is executed on the control volume pairs 122a, 142a. This places the control volumes 122a in an extended long busy state and prevents further writes to the control volumes 122a, in effect pausing the system data movers 132 on a consistency group boundary. In particular, the system data movers 132 copy data from the data volumes 122b to the data volumes 142b in consistency groups. The system data movers 132 record information about a consistency group on the control volumes 122a when the entire consistency group has been copied from data volumes 122b to data volumes 142b. Also, in order for the system data movers 132 to move from one consistency group (e.g., consistency group 100) to another consistency group (e.g., consistency group 101), the system data movers 132 have to complete updating the information on the control volumes 122a. Thus, by freezing activity on the control volumes 122a, embodiments are able to pause the system data movers 132 on a consistency boundary (i.e., when the control volumes 122a are frozen, the system data movers 132 are not able to record information on a consistency group on the control volumes 122a). Because the time that the tertiary copy is to be made may be set to any point in time, the system data movers 132 may or may not complete a current consistency group when the tertiary copy is to be made, but, with embodiments, the system data movers do not start moving data for a new consistency group. Additionally, while the control volumes 122a are frozen (i.e., control volumes 122a are being copied to control volumes 142a, but new writes to the control volumes 122a are not allowed), a parallel instant virtual copy operation is performed on the secondary data volumes 122b, allowing them to complete within a time window that is tolerable to the session. The session may be described as a grouping of volumes that the system data movers 132 handle. The extended long busy state is then removed, allowing the system data movers 132 to proceed with normal mirroring.

Enterprise Storage Server, Flashcopy, and 3990 are registered trademarks or common law marks of International Business Machines Corporation in the United States and/or other countries.

Additional Embodiment Details

The described operations may be implemented as a method, computer program product or apparatus using standard programming and/or engineering techniques to produce software, firmware, hardware, or any combination thereof.

Each of the embodiments may take the form of an entirely hardware embodiment, an entirely software embodiment or an embodiment containing both hardware and software elements. The embodiments may be implemented in software, which includes but is not limited to firmware, resident software, microcode, etc.

Furthermore, the embodiments may take the form of a computer program product accessible from a computer-usable or computer-readable medium providing program code for use by or in connection with a computer or any instruction execution system. For the purposes of this description, a computer-usable or computer readable medium may be any apparatus that may contain, store, communicate, propagate, or transport the program for use by or in connection with the instruction execution system, apparatus, or device.

The described operations may be implemented as code maintained in a computer-usable or computer readable medium, where a processor may read and execute the code from the computer readable medium. The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a rigid magnetic disk, an optical disk, magnetic storage medium (e.g., hard disk drives, floppy disks, tape, etc.), volatile and non-volatile memory devices (e.g., a random access memory (RAM), DRAMs, SRAMs, a read-only memory (ROM), PROMs, EEPROMs, Flash Memory, firmware, programmable logic, etc.). Current examples of optical disks include compact disk-read only memory (CD-ROM), compact disk-read/write (CD-R/W) and DVD.

The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices.

A computer program product may comprise computer useable or computer readable media, hardware logic, and/or transmission signals in which code may be implemented. Of course, those skilled in the art will recognize that many modifications may be made to this configuration without departing from the scope of the embodiments, and that the computer program product may comprise any suitable information bearing medium known in the art.

The term logic may include, by way of example, software, hardware, firmware, and/or combinations of software and hardware.

Certain embodiments may be directed to a method for deploying computing infrastructure by a person or automated processing integrating computer-readable code into a computing system, wherein the code in combination with the computing system is enabled to perform the operations of the described embodiments.

The logic of FIGS. 5-6 describes specific operations occurring in a particular order. In alternative embodiments, certain of the logic operations may be performed in a different order, modified or removed. Moreover, operations may be added to the above described logic and still conform to the described embodiments. Further, operations described herein may occur sequentially or certain operations may be processed in parallel, or operations described as performed by a single process may be performed by distributed processes.

The illustrated logic of FIGS. 5-6 may be implemented in software, hardware, programmable and non-programmable gate array logic or in some combination of hardware, software, or gate array logic.

Figure 7:
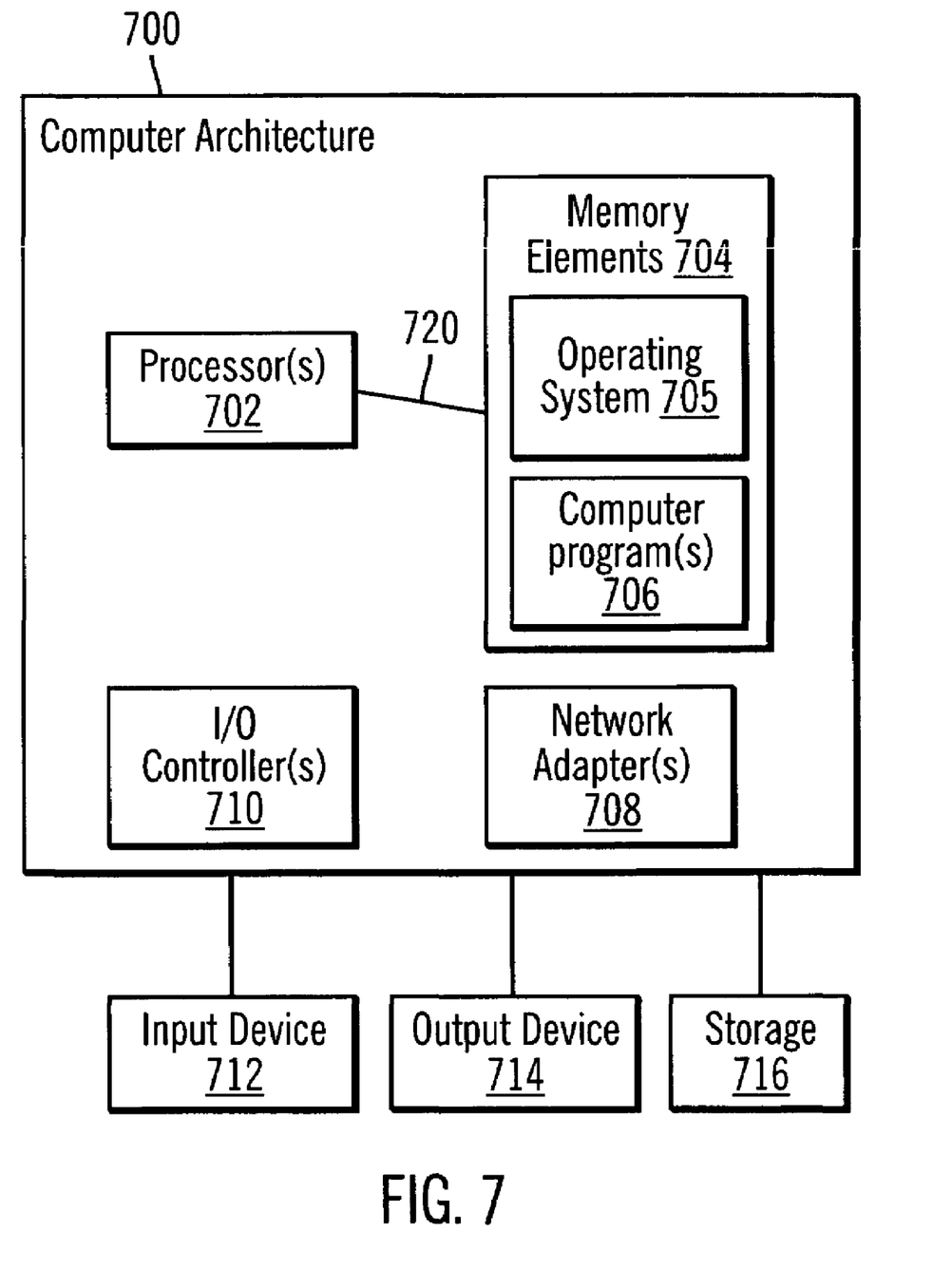
FIG. 7 illustrates an architecture of a computer system that may be used in accordance with certain embodiments.

FIG. 7 illustrates a system architecture 700 that may be used in accordance with certain embodiments. Primary control unit 100 and secondary control unit 120 may implement system architecture 700. The system architecture 700 is suitable for storing and/or executing program code and includes at least one processor 702 coupled directly or indirectly to memory elements 704 through a system bus 720. The memory elements 704 may include local memory employed during actual execution of the program code, bulk storage, and cache memories which provide temporary storage of at least some program code in order to reduce the number of times code must be retrieved from bulk storage during execution. The memory elements 704 include an operating system 705 and one or more computer programs 706.

Input/Output (I/O) devices 712, 714 (including but not limited to keyboards, displays, pointing devices, etc.) may be coupled to the system either directly or through intervening I/O controllers 710.

Network adapters 708 may also be coupled to the system to enable the data processing system to become coupled to other data processing systems or remote printers or storage devices through intervening private or public networks. Modems, cable modem and Ethernet cards are just a few of the currently available types of network adapters 708.

The system architecture 700 may be coupled to storage 716 (e.g., a non-volatile storage area, such as magnetic disk drives, optical disk drives, a tape drive, etc.). The storage 716 may comprise an internal storage device or an attached or network accessible storage. Computer programs 706 in storage 716 may be loaded into the memory elements 704 and executed by a processor 702 in a manner known in the art.

The system architecture 700 may include fewer components than illustrated, additional components not illustrated herein, or some combination of the components illustrated and additional components. The system architecture 700 may comprise any computing device known in the art, such as a mainframe, server, personal computer, workstation, laptop, handheld computer, telephony device, network appliance, virtualization device, storage controller, etc.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the embodiments, the embodiments reside in the claims hereinafter appended or any subsequently-filed claims, and their equivalents.

What is claimed is:

1. A computer-implemented method for copying data, comprising:

receiving a quick copy command from a user to copy data from a secondary storage at a secondary control unit to a tertiary storage at the secondary control unit, wherein the secondary storage maintains copies of one or more volumes of a primary storage at a primary control unit, wherein the quick copy command indicates one or more control volume pairs for which a freeze indicator is set to indicate that a freeze is to occur and one or more data volume pairs for which a freeze indicator is set to indicate that a freeze is not to occur, and wherein the freeze indicator being set to indicate that the freeze is to occur indicates that the one or more control volume pairs are not to be written to; and in response to receiving the quick copy command, performing a consistent instant virtual copy operation for each of the one or more control volume pairs for which the freeze indicator is set to indicate that the freeze is to occur to pause a system data mover on a consistency group boundary while each of the one or more data volume pairs are copied with an instant virtual copy operation and while the one or more data volume pairs are in a duplex state in which updates are being mirrored between the primary storage and the secondary storage.

2. The method of claim 1, further comprising:

applying a last consistency group from secondary data volumes in the secondary storage to tertiary data volumes in the secondary storage.

3. The method of claim 1, wherein each of the one or more control volume pairs includes a first control volume and a second control volume and wherein performing the consistent instant virtual copy further comprises:

setting the first control volume in a control volume pair to a long busy state to disable writes to the first control volume; and performing copy operations from the first control volume to the second control volume.

4. The method of claim 3, further comprising:

in response to determining that the instant virtual copy operation for each of the one or more data volume pairs has completed, performing a consistency group operation on the one or more control volumes to reset the long busy state of the first control volume in the control volume pair to enable writes to the first control volume.

5. The method of claim 1, wherein each of the one or more data volume pairs includes a first data volume and a second data volume and wherein performing the instant virtual copy operation for each of the one or more data volume pairs further comprises:

copying data from the first data volume to the second data volume.

6. A computer program product for copying data comprising a computer readable medium storing a computer readable program, wherein the computer readable program when executed by a processor on a computer causes the computer to:

receive a quick copy command from a user to copy data from a secondary storage at a secondary control unit to a tertiary storage at the secondary control unit, wherein the secondary storage maintains copies of one or more volumes of a primary storage at a primary control unit, wherein the quick copy command indicates one or more control volume pairs for which a freeze indicator is set to indicate that a freeze is to occur and one or more data volume pairs for which a freeze indicator is set to indicate that a freeze is not to occur, and wherein the freeze indicator being set to indicate that the freeze is to occur indicates that the one or more control volume pairs are not to be written to; and in response to receiving the quick copy command, perform a consistent instant virtual copy operation for each of the one or more control volume pairs for which the freeze indicator is set to indicate that the freeze is to occur to pause a system data mover on a consistency group boundary while each of the one or more data volume pairs are copied with an instant virtual copy operation and while the one or more data volume pairs are in a duplex state in which updates are being mirrored between the primary storage and the secondary storage.

7. The computer program product of claim 6, wherein the computer readable program when executed on a computer causes the computer to:

apply a last consistency group from secondary data volumes in the secondary storage to tertiary data volumes in the secondary storage.

8. The computer program product of claim 6, wherein each of the one or more control volume pairs includes a first control volume and a second control volume and wherein, when performing the consistent instant virtual copy, the computer readable program when executed on a computer causes the computer to:

set the first control volume in a control volume pair to a long busy state to disable writes to the first control volume; and perform copy operations from the first control volume to the second control volume.

9. The computer program product of claim 8, wherein the computer readable program when executed on a computer causes the computer to:

in response to determining that the instant virtual copy operation for each of the one or more data volume pairs has completed, perform a consistency group operation on the one or more control volumes to reset the long busy state of the first control volume in the control volume pair to enable writes to the first control volume.

10. The computer program product of claim 6, wherein each of the one or more data volume pairs includes a first data volume and a second data volume and wherein, when performing the instant virtual copy operation for each of the one or more data volume pairs, the computer readable program when executed on a computer causes the computer to:

copy data from the first data volume to the second data volume.

11. A system for copying data, comprising:

hardware logic capable of performing operations, the operations comprising:

receiving a quick copy command from a user to copy data from a secondary storage at a secondary control unit to a tertiary storage at the secondary control unit, wherein the secondary storage maintains copies of one or more volumes of a primary storage at a primary control unit, wherein the quick copy command indicates one or more control volume pairs for which a freeze indicator is set to indicate that a freeze is to occur and one or more data volume pairs for which a freeze indicator is set to indicate that a freeze is not to occur, and wherein the freeze indicator being set to indicate that the freeze is to occur indicates that the one or more control volume pairs are not to be written to; and in response to receiving the quick copy command, performing a consistent instant virtual copy operation for each of the one or more control volume pairs for which the freeze indicator is set to indicate that the freeze is to occur to pause a system data mover on a consistency group boundary while each of the one or more data volume pairs are copied with an instant virtual copy operation and while the one or more data volume pairs are in a duplex state in which updates are being mirrored between the primary storage and the secondary storage.

12. The system of claim 11, wherein the operations further comprise:

applying a last consistency group from secondary data volumes in the secondary storage to tertiary data volumes in the secondary storage.

13. The system of claim 11, wherein each of the one or more control volume pairs includes a first control volume and a second control volume and wherein operations for performing the consistent instant virtual copy further comprise:

setting the first control volume in a control volume pair to a long busy state to disable writes to the first control volume; and performing copy operations from the first control volume to the second control volume.

14. The system of claim 13, wherein the operations further comprise:

in response to determining that the instant virtual copy operation for each of the one or more data volume pairs has completed, performing a consistency group operation on the one or more control volumes to reset the long busy state of the first control volume in the control volume pair to enable writes to the first control volume.

15. The system of claim 11, wherein each of the one or more data volume pairs includes a first data volume and a second data volume and wherein the operations for performing the instant virtual copy operation for each of the one or more data volume pairs further comprise:

copying data from the first data volume to the second data volume.

16. A method for creating a tertiary copy from a secondary copy, comprising:

while propagating updates from a primary copy at a primary control unit to the secondary copy at a secondary control unit, performing a consistent instant virtual copy operation for each of one or more control volume pairs in the secondary copy and the tertiary copy for which a freeze indicator is set to indicate that a freeze is to occur to pause a system data mover on a consistency group boundary while one or more data volume pairs are copied with an instant virtual copy operation; and in response to determining that the instant virtual copy operation for each of the one or more data volume pairs has completed, performing a consistency group operation on the one or more control volumes to unfreeze activity on each of the one or more control volume pairs.

17. The method of claim 16, further comprising:

applying a last consistency group from secondary data volumes in the secondary storage to tertiary data volumes in the secondary storage.

18. The method of claim 16, wherein each of the one or more control volume pairs includes a secondary control volume and a tertiary control volume and wherein performing the consistent instant virtual copy further comprises:

setting the secondary control volume to a long busy state to disable writes to the secondary control volume; and performing copy operations from the secondary control volume to the tertiary control volume.

19. The method of claim 18, further comprising:

in response to determining that the instant virtual copy operation for each of the one or more data volume pairs has completed, performing a consistency group operation on the one or more control volumes to reset the long busy state of the secondary control volume in the control volume pair to enable writes to the secondary control volume.

20. The method of claim 16, wherein each of the one or more data volume pairs includes a secondary data volume and a tertiary data volume and wherein performing the instant virtual copy operation for each of the one or more data volume pairs further comprises:

copying data from the secondary data volume to the tertiary data volume.

21. A computer program product for creating a tertiary copy from a secondary copy comprising a computer readable medium storing a computer readable program, wherein the computer readable program when executed by a processor on a computer causes the computer to:

while propagating updates from a primary copy at a primary control unit to the secondary copy at a secondary control unit, perform a consistent instant virtual copy operation for each of one or more control volume pairs in the secondary copy and the tertiary copy for which a freeze indicator is set to indicate that a freeze is to occur to pause a system data mover on a consistency group boundary while one or more data volume pairs are copied with an instant virtual copy operation; and in response to determining that the instant virtual copy operation for each of the one or more data volume pairs has completed, perform a consistency group operation on the one or more control volumes to unfreeze activity on each of the one or more control volume pairs.

22. The computer program product of claim 21, wherein the computer readable program when executed on a computer causes the computer to:

apply a last consistency group from secondary data volumes in the secondary storage to tertiary data volumes in the secondary storage.

23. The computer program product of claim 21, wherein each of the one or more control volume pairs includes a secondary control volume and a tertiary control volume and wherein, when performing the consistent instant virtual copy, the computer readable program when executed on a computer causes the computer to:

set the secondary control volume to a long busy state to disable writes to the secondary control volume; and perform copy operations from the secondary control volume to the tertiary control volume.

24. The computer program product of claim 23, wherein the computer readable program when executed on a computer causes the computer to:

in response to determining that the instant virtual copy operation for each of the one or more data volume pairs has completed, perform a consistency group operation on the one or more control volumes to reset the long busy state of the secondary control volume in the control volume pair to enable writes to the secondary control volume.

25. The computer program product of claim 21, wherein each of the one or more data volume pairs includes a secondary data volume and a tertiary data volume and wherein, when performing the instant virtual copy operation for each of the one or more data volume pairs, the computer readable program when executed on a computer causes the computer to:

copy data from the secondary data volume to the tertiary data volume.

26. A system for creating a tertiary copy from a secondary copy, comprising:

hardware logic capable of performing operations, the operations comprising:

while propagating updates from a primary copy at a primary control unit to the secondary copy at a secondary control unit, performing a consistent instant virtual copy operation for each of one or more control volume pairs in the secondary copy and the tertiary copy for which a freeze indicator is set to indicate that a freeze is to occur to pause a system data mover on a consistency group boundary while one or more data volume pairs are copied with an instant virtual copy operation; and in response to determining that the instant virtual copy operation for each of the one or more data volume pairs has completed, performing a consistency group operation on the one or more control volumes to unfreeze activity on each of the one or more control volume pairs.

27. The system of claim 26, wherein the operations further comprise:

applying a last consistency group from secondary data volumes in the secondary storage to tertiary data volumes in the secondary storage.

28. The system of claim 26, wherein each of the one or more control volume pairs includes a secondary control volume and a tertiary control volume and wherein the operations for performing the consistent instant virtual copy further comprise:

setting the secondary control volume to a long busy state to disable writes to the secondary control volume; and performing copy operations from the secondary control volume to the tertiary control volume.

29. The system of claim 28, wherein the operations further comprise:

in response to determining that the instant virtual copy operation for each of the one or more data volume pairs has completed, performing a consistency group operation on the one or more control volumes to reset the long busy state of the secondary control volume in the control volume pair to enable writes to the secondary control volume.

30. The system of claim 26, wherein each of the one or more data volume pairs includes a secondary data volume and a tertiary data volume and wherein the operations for performing the instant virtual copy operation for each of the one or more data volume pairs further comprise:

copying data from the secondary data volume to the tertiary data volume.

* * * * *